United States Patent [19]
Levi et al.

[11] Patent Number: 5,875,704
[45] Date of Patent: Mar. 2, 1999

[54] DEVICE FOR SECURING A FILTER-CARRYING CUP BELOW THE CUP CARRIER OF A COFFEE MACHINE

[76] Inventors: Mario Levi, Les Lavandes 90 avenue de la Lanterne; Jean Pierre Levi, Résidence Isola Celesta 4 Corniche Fleurie, both of F-06200 Nice, France

[21] Appl. No.: 894,532

[22] PCT Filed: Feb. 21, 1996

[86] PCT No.: PCT/FR96/00270

§ 371 Date: Aug. 21, 1997

§ 102(e) Date: Aug. 21, 1997

[87] PCT Pub. No.: WO96/25870

PCT Pub. Date: Aug. 29, 1996

[30] Foreign Application Priority Data

Feb. 21, 1995 [FR] France ..................................... 95 01961

[51] Int. Cl.[6] ..................................................... A47J 31/24
[52] U.S. Cl. ........................................... 99/295; 99/302 R
[58] Field of Search ........................ 99/293, 295, 302 R, 99/304, 307

[56] References Cited

U.S. PATENT DOCUMENTS

| | | | |
|---|---|---|---|
| 4,759,274 | 7/1988 | Schmidt | 99/295 |
| 5,473,973 | 12/1995 | Cortese | 99/295 |

FOREIGN PATENT DOCUMENTS

| | | |
|---|---|---|
| 894 192 | 2/1983 | Belgium . |
| 574 079 | 7/1924 | France . |
| 666 825 | 10/1929 | France . |
| 1077843 | 3/1960 | Germany . |
| 162960 | 9/1933 | Switzerland . |

*Primary Examiner*—Reginald L. Alexander
*Attorney, Agent, or Firm*—Young & Thompson

[57] ABSTRACT

A filter ladle is provided with twoside projections with a helical contact surface consisting of two portions with different pitches and engaging a shoulder on the end of bearing pins mounted under the ladle holder of a coffee machine. The device is useful for coffee machines.

4 Claims, 2 Drawing Sheets

DEVICE FOR SECURING A FILTER-CARRYING CUP BELOW THE CUP CARRIER OF A COFFEE MACHINE

FIELD OF THE INVENTION

The invention relates to a device for securing a filter-carrying cup below the cup carrier of a coffee machine.

BACKGROUND OF THE INVENTION

In present coffee machines, the filter-carrying cups are introduced in a cylindrical recess surrounding the pressurizer provided with its water inlet sprinkling grill.

The securement of a filter-carrying cup in such a cylindrical recess is achieved by means of a bayonet connection combined with helicoidal ramps permitting obtaining simultaneously the progressive compression of the dose of ground coffee, previously introduced into the filter, before securement of the filter-carrying cup to the coffee machine, and the seal between the edge of the filter-carrying cup and the cup joints situated about the pressurizer, in the bottom of the recess. This is the case for the patents FR-A-666,825, BE-A-894,192, FR-A-574,079 and DE-B-1,077,843.

To do this, the filter-carrying cup comprises, at its periphery, two diametrically opposed projections adapted to engage in free spaces between two helicoidal ramps, located at the base of the interior of the cylindrical recess. It suffices, after having introduced a filter-carrying cup into said recess and having engaged its projections on the lower end of the ramps, to exert, on said filter-carrying cup, with the aid of the handle with which it is provided, a rotative couple in the direction and with sufficient force to obtain both the temporary securement of the filter-carrying cup to the cylindrical recess, the compression of the dose of coffee and sufficient penetration of the cup joint to ensure sealing.

Removal of the filter-carrying cup, after the infusion has flowed out into the cup or cups, takes place much more easily because it suffices to exert a shock in the opposite direction on the handle of the cup, to obtain loosening of the edge of the cup relative to the cup joint and the sliding, in the reverse direction, of the projections along the helicoidal ramps, toward complete disengagement.

Such devices, although they give together satisfaction from a strictly functional standpoint, nevertheless have certain major drawbacks, that should be emphasized.

First of all, the user must ensure precise positioning of the filter-carrying cup relative to the recess, to obtain the engagement of the projections on the end of the ramps, which are, by their nature, masked from view.

Then, a rather great effort must be exerted on the handle of the filter-carrying cup, to obtain the complete engagement of the filter carrier in its recess, this force must be sufficient to overcome the frictional resistances between projections and ramps; as a result, there is a certain cumulative fatigue suffered by persons who by their occupation must repeatedly daily use coffee machines with this conventional device.

Moreover, the helicoidal ramps are masked from the view of the operator, which is also the case of the sprinkling grill, of the compactor and above all of the cup joint, which, located at the bottom of the annular space delimited by the recess and the compressor, can be only very difficulty inspected, cleaned and replaced.

As a result, these devices, given their difficulty of access, are not easy to clean and do not satisfy the rules and regulations of construction to ensure cleanliness and use of materials suitable for foods (French Unified Standard 60.010 and USA Standard NSF (National Sanitation Foundation) Standard 4, particularly).

Moreover, this type of construction requires the provision of members of rather complicated shape, difficult to produce and as a result very costly.

There is already known from Swiss patent CH-A-162,960, a device partially overcoming certain of these drawbacks mentioned above. The recess comprises two diametrically opposed notches, opening outwardly; each notch providing two helicoidal ramps that are opposite and symmetrical. The projections for securing the filter-carrying cup are replaced by carrying rollers. Thus, the difficulties of engagement are in large part overcome, because the entry of the notches of the recess and the carrier rollers of the filter-carrying cup remain permanently visible from the exterior, and as a result, by the operator. Add to that that the filter-carrying cup can be if desired locked against the cup joint toward the left or toward the right.

However, the difficulties of cleaning remain, because the pressurizer, and above all the cup joint, remain masked from view and difficult of access.

SUMMARY OF THE INVENTION

The present invention has for its object to overcome these drawbacks. This invention, as it is characterized, solves the problem consisting of creating a device for securement of the filter-carrying cup below the cup carrier of a coffee machine, with which, on the one hand, the engagement and locking will be easy, and, on the other hand, the essential members such as locking ramps, sprinkling grill, compactor and above all the cup joint, will remain visible and very accessible.

The securement device for a filter-carrying cup below the cup carrier of a coffee machine, comprising diametrically opposed projections on the periphery of the filter-carrying cup and abutment elements fixed below the cup carrier and coacting with the projections to obtain, under the influence of the rotation of the filter-carrying cup, the bringing together of this latter of the cup carrier terminating by the impression of the sealing joint fixed below the cup carrier, is characterized, according to the invention, in that the contact surface of the projections is helical, with an axis coinciding with that of the axis of rotation of the filter-carrying cup, and in that the bearing elements fixed below the cup carrier are constituted by two shouldered axles, disposed symmetrically relative to the axis of the cup carrier.

According to a preferred embodiment of the projections, the helical contact surface is in two portions of different pitches, of which that situated on the attack side of the edge has the steeper pitch and covers a sector permitting obtaining, by the corresponding rotation of the filter-carrying cup, a rapid coming into contact of the edge of the cup with the cup joint.

Also preferably, the shouldered axles are mounted freely rotatably.

The advantages obtained from this invention consist essentially in that the cleaning of the cup carrier is easy and satisfies safety standards, given the direct access to the cup joint for its cleaning or its replacement; the operation is easy thanks to a largely open introduction region; and the construction is simplified and hence less expensive.

BRIEF DESCRIPTION OF THE DRAWINGS

Other characteristics and advantages will become apparent from the description which follows, of an embodiment of a securement device for a filter-carrying cup below the cup carrier of a coffee machine, according to the invention, given by way of non-limiting example with reference to the accompanying drawings.

Finally.

DETAILED DESCRIPTION OF THE INVENTION

Figure 1:
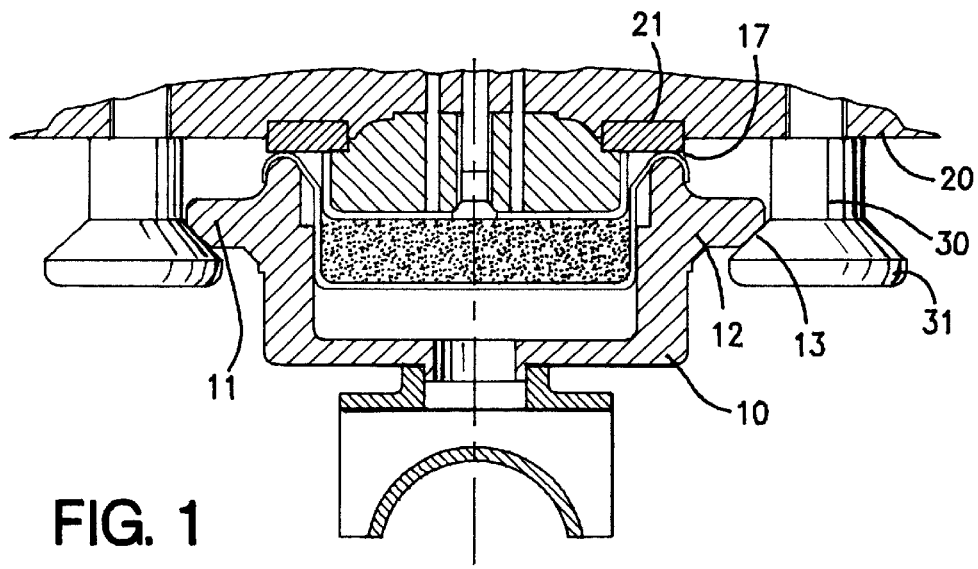
FIG. 1 is a fragmentary cross-sectional elevational view of a cup carrier below which is secured a filter-carring cup.

The figures show a securement device for a filter-carring cup below the cup carrier of a coffee machine, whose filter-carrying cup 10 is provided with two lateral projections 11 and 12, of which the helicoidal contact surface is in two portions 13 and 14 of different pitches, and is adapted to bear on the shoulder 31 of shouldered axles 30 fixed below the cup carrier 20.

Figure 2:
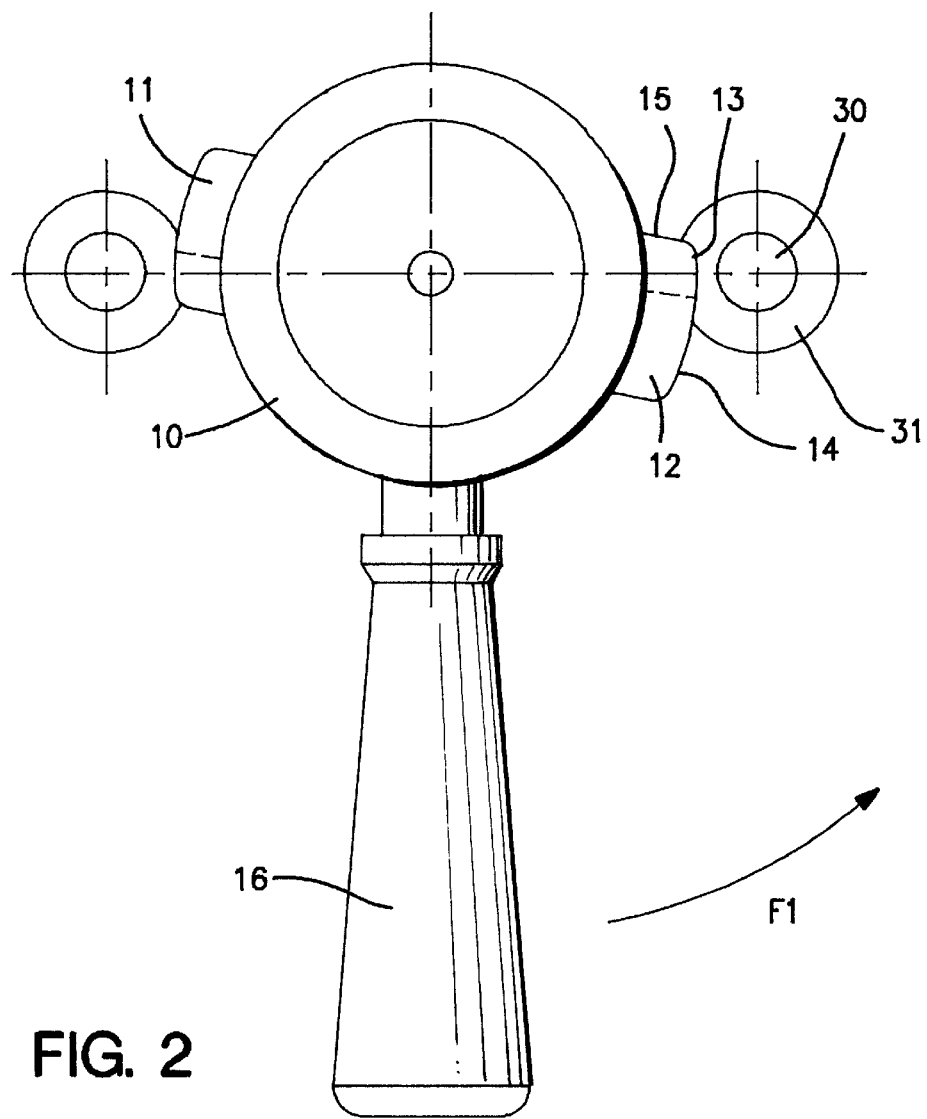
FIG. 2 is a view from above of the securement device according to FIG. 1.
Figure 4:
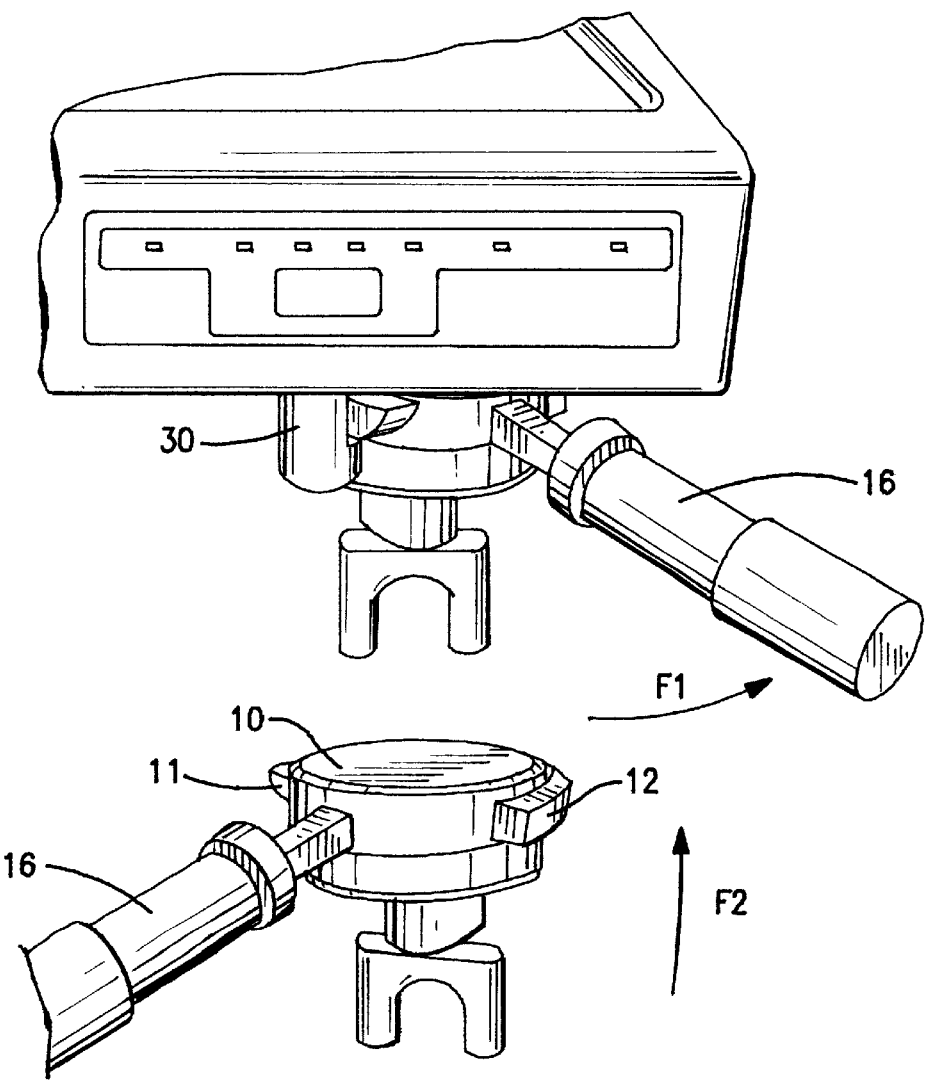
FIG. 4 is a perspective view of a coffee machine using the invention, the figure showing the approach phase of the filter-carrying cup and the locking in position phase of said cup in the coffee machine.

With more particular reference to FIGS. 1 and 2, it will be noted first in FIG. 2 and FIG. 4 in the direction of arrow F2, that a very wide latitude of presentation of the filter-carrying cup 10 relative to the shouldered axles 30 is permitted, then, referring to FIG. 1, that the contact surfaces 13 and 14 of the projections 11 and 12 come, upon rotation of the filter-carrying cup 10, into contact by the attack edge 15 against the shoulder 31 of the shouldered axles 30, then, continuing this rotation by action on the handle 16, said filter-carrying cup is rapidly raised, by relative freeing of the forward portion 13 of the contact surface of projections 11 and 12 by the shoulder 31 of the shouldered axles 30. Given the steep pitch of this helicoidal portion, the engagement of the rear portion 14 of the contact surface permits, given its low pitch, obtaining sufficient penetration of the cup joint 21 by the edge 17 of the cup, for a small force applied horizontally on the handle 16 of the filter-carrying cup 10.

Figure 3:
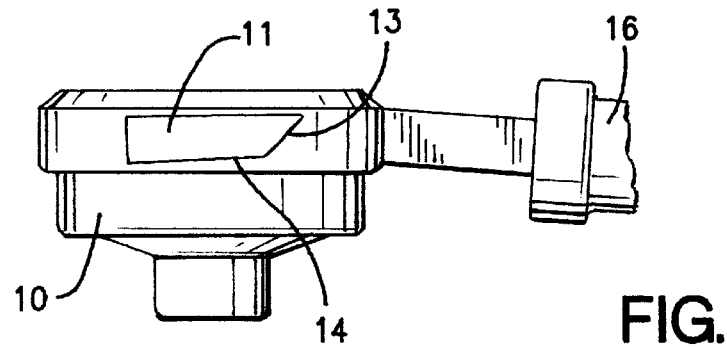
FIG. 3 is a filter-carrying cup according to the invention in side view.

FIG. 3 shows the particular shape of the lateral projections 11 and 12 which permits the securement of the filter-carrying cup 10 against the shouldered axles 30. Each projection 11 or 12 comprises two contact surfaces 13 and 14.

The first contact surface 13 has a steep pitch, in that the angle of inclination relative to the horizontal is comprised between 30° and 40°.

At present, an angle of 300 is the most interesting.

The second contact surface 14 has a low pitch, because the angle of inclination relative to the horizontal is several degrees, namely 1° to 5°.

When the handle 16 is moved in rotation in the direction of arrow F1, the steep pitch of the contact surface 13 permits rapid approachment of the filter-carrying cup 10 to the cup carrier 20, whilst the small pitch of the surface 14 permits efficacious locking, because the application of force is easy to regulate for the user, of said cup 10 on the cup carrier 20.

What is claimed is:

1. Device for securing a filter-carrying cup below the cup carrier of a coffee machine, comprising diametrically opposed projections on the periphery of the filter-carrying cup and bearing elements fixed below the cup carrier and coacting with the projections to obtain, under the influence of rotation of the filter-carrying cup, an approach of this the filter-carrying cup to the cup carrier resulting in the impression of the filter-carrying cup with a sealing joint fixed below the cup carrier, wherein the contact surface (13, 14) of the projections (11, 12) is helical, with an axis coinciding with the axis of rotation of the filter-carrying cup (10), and that the bearing elements fixed below the cup carrier (20) are constituted of two shouldered axles (30), disposed symmetrically relative to the axis of the cup carrier (20).

2. Device, according to claim 1, wherein the helical configuration of the contact surface of the projections (11, 12) is in two portions (13, 14) of different pitches, of which that located on an attack edge side (15) has the steeper pitch.

3. Device, according to claim 2, wherein the portion (13) of helical shape with steepest pitch, located on the attack edge side (15) of the projections (11, 12), covers a sector permitting obtaining, by corresponding rotation of the filter-carrying cup (10), a rapid contact of the edge (17) of the cup (10) with the sealing joint (21) of the cup.

4. Device, according to claim 1, wherein the shouldered axles (30) are free to rotate.

\* \* \* \* \*